United States Patent [19]

Neumann et al.

[11] Patent Number: 4,812,048

[45] Date of Patent: Mar. 14, 1989

[54] MATERIAL FEED DEVICE FOR AN EXTRUDER

[75] Inventors: Ulrich Neumann, Bad Oeynhausen; Volkmar Wölfl, Vlotho/Valdorf, both of Fed. Rep. of Germany

[73] Assignee: Inoex GmbH Innovationen und Austrustungen Fur Die Extrusionstechnik, Bad Oeynnausen, Fed. Rep. of Germany

[21] Appl. No.: 141,035

[22] Filed: Jan. 5, 1988

[30] Foreign Application Priority Data

Feb. 25, 1987 [DE] Fed. Rep. of Germany ....... 3705963

[51] Int. Cl.$^4$ ............................................ B01F 15/04
[52] U.S. Cl. ..................................... 366/141; 366/18; 366/76; 366/150
[58] Field of Search ...................... 366/76, 17, 18, 141, 366/20, 150, 183, 182, 341, 9; 414/292, 310

[56] References Cited

U.S. PATENT DOCUMENTS

| | | | |
|---|---|---|---|
| 1,326,375 | 12/1919 | Spencer | 366/76 |
| 3,259,375 | 5/1966 | Sackett, Sr. | 366/141 |
| 3,920,229 | 11/1975 | Piggott | 366/76 |
| 4,286,883 | 9/1981 | Johanson | 366/141 |
| 4,660,990 | 4/1987 | Svensson | 366/141 |

FOREIGN PATENT DOCUMENTS

| | | | |
|---|---|---|---|
| 1806636 | 5/1970 | Fed. Rep. of Germany | 259/154 |
| 1213121 | 9/1986 | Japan | 366/76 |
| 0812664 | 3/1981 | U.S.S.R. | 414/292 |
| 781375 | 8/1957 | United Kingdom | 414/292 |

Primary Examiner—Timothy F. Simone
Attorney, Agent, or Firm—Sprung Horn Kramer & Woods

[57] ABSTRACT

The invention relates to a material feed device for an extruder. The material feed device has a storage container (4) suspended with provision for free movement on measuring members (3) of a mass throughput weighing device. The outlet (13) of the storage container (4) discharges into an inlet (5) of a feed unit (6) of the extruder. The outlet (13) and the inlet (5) are sealed off on the outside by a seal (16) enabling the storage container (4) to move freely in relation to the inlet (5). The seal comprises a rigid ring bearing via a sealing lip (17) against the outside of the tubular outlet (13) and borne via a sealing lip (18) on a flat sliding surface (15) of the inlet (5). While the sealing lip (17) bearing on the tubular outlet (13) enables the storage container (4) to make a vertical movement, the sealing lip (18) bearing on the flat surface (15) enables the storage container (4) to make a horizontal movement in both axes in relation to the inlet (5). Measuring errors are substantially excluded due to this seal, which does not impede the freedom of movement of the storage container (4).

7 Claims, 1 Drawing Sheet

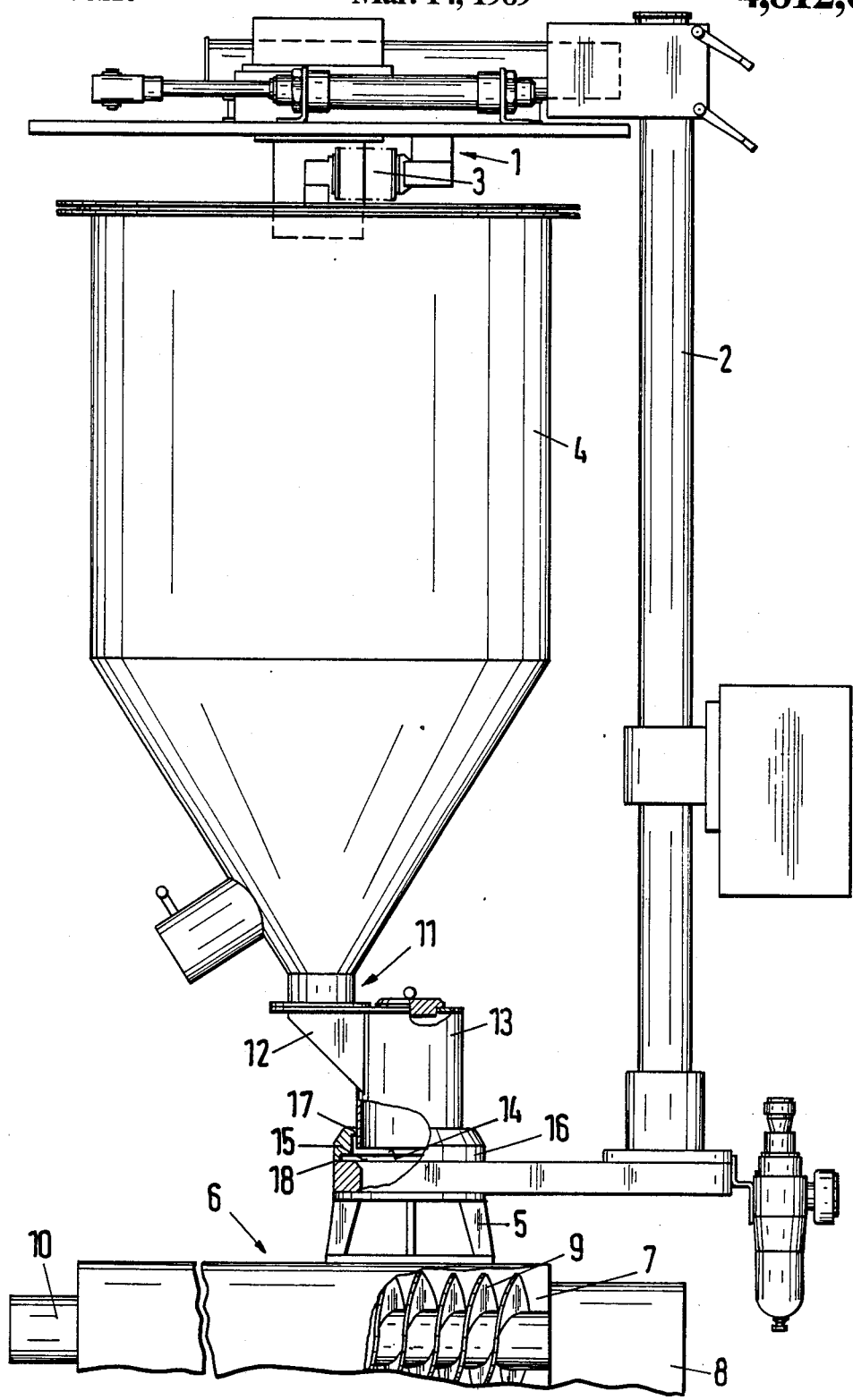

1

MATERIAL FEED DEVICE FOR AN EXTRUDER

BACKGROUND FOR THE INVENTION

1. Field of the Invention

The invention relates to a material feed device for an extruder, comprising a more particularly funnel-shaped storage container acting as a weighing container of a mass throughput weighing device and suspended with provision for free movement from measuring members and discharging via a tubular outlet into the inlet of a feed unit of the extruder, more particularly a cylinder containing a feed screw, the outlet and inlet being sealed off from outside by a seal which enables the storage tank to move freely.

2. Discussion of Prior Art

In a prior art material feed device of the kind specified the seal takes the form of bellows connected by one edge to the inlet of the feed unit and by the other edge to the outlet of the storage container. The seal bridges an axial gap between the outlet and inlet and enables the storage container with its outlet to move freely both vertically and horizontally in relation to the feed unit disposed stationary with its inlet. Such freedom of movement is necessary, since otherwise it is impossible for the weighing device to deal continuously with the mass throughput.

However, the use of material feed device of the kind specified has shown that the mass throughput is not dealt with satisfactorily. It was found that one source of error was the flexible bellows-type seal. To perform its sealing function, the seal cannot be infinitely flexible, but requires some rigidity. The seal limits more particularly horizontal mobility, but such mobility is necessary, since if the measuring members used are, for example, bending rods, the weighing container inevitably makes horizontal movements.

SUMMARY OF THE INVENTION

It is an object of the invention to improve the material feed device of the kind specified so as to reduce measuring errors caused by the seal when weighing the mass throughput.

To this end according to the invention the seal comprises a rigid ring which bears, with provision for axial movement via a sealing surface, especially a sealing lip extending around its radial inner side against the tubular outlet of the storage container and is borne with provision for movement via an underside flat sealing ring surface on a flat sealing surface provided on the inlet of the feed unit. Preferably the underside flat sealing ring surface takes the form of a sealing lip. According to a further feature of the invention, the parts sliding on one another can be given a friction-reducing coating or cover.

Due to the construction of the seal according to the invention, during weighing the storage container can move practically free from force in all three axes in relation to the stationary inlet of the feed unit. There is no longer any need to reach a compromise between the inherent rigidity of the seal, required for the sealing effect, and seal mobility, as required for maximum measuring accuracy. Since the seal takes the form of a rigid ring, the sealing effect is optimum. The seal can take the form of a rigid ring since for both kinds of movement, namely vertical and horizontal movement, it has independent sealing surfaces which retain their shape even when the storage container is displaced. Since modern techniques enable the frictional factors on the sealing surface to be extremely low, practically no force is required for displacement, and therefore in practice no measuring error is caused by the seal.

DESCRIPTION OF AN EMBODIMENT OF THE INVENTION

Brief Description of the Drawing

An embodiment of the invention will now be described in greater detail with reference to a drawing, namely a diagrammatic side elevation of an embodiment of a material feed device.

Detailed Description of the Embodiment of the Invention

A storage container 4 constructed as a weighing container which can be filled with material from above is suspended via measuring members 3 from a cantilever arm 1 of an upright 2. The measuring members 3, disposed on diametrically opposite sides, are elements which respond to bending. They deliver their measured values to an evaluation device (not shown) for determining mass throughput. The upright 2 is rigidly connected to an inlet 5 of a conveyor unit 6 comprising a cylinder 7 containing a screw 9 driven by a drive 8 and an extruder nozzle 10.

The storage container 4 has in its tapering lower part a transition member 11 having an inclined surface 12.

A tubular outlet 13 is provided laterally of the transition member 11. The material passing from the storage container 4 to the transition member 11 breaks off on its side adjacent the outlet 13, thus dropping into the outlet 13. The result is a decoupling of the mass flow, which otherwise might lead to measuring errors.

The bottom edge 14 of the outlet 13 is disposed at a vertical distance in relation to the upper side 15 of the inlet 5. The gap thus created is sealed by a seal 16 comprising a rigid ring. The seal 16 encloses the tubular outlet 13 and bears via a sealing lip 17 against the outside of the tubular outlet 13. The outlet 13 can therefore move vertically in relation to the annular seal 16.

The upper side of the inlet 5 takes the form of a flat sealing surface on which the annular seal 16 rests via a flat sealing lip 18. Due to this construction, the annular seal 16 can be displaced horizontally in both axes on the flat sealing lip 18. Clearly, the top side flat sealing surface 15 of the inlet must be of such dimensions that the annular seal 16 can perform all the required horizontal movements without moving by its sealing lip 18 out of the zone of the flat sealing surface 15.

Due to the seal 16 formed by the rigid ring and the associated sealing surfaces on the tubular outlet 13 and the inlet 5 the storage container can be displaced in all three axes—i.e., in the vertical and both horizontal axes—, without the necessity of forces which might falsify the measured value. The forces required for the displacement are negligible with a suitable surface design and selection of materials. In addition to this advantage of improved measuring accuracy, the invention provides the further advantage of a longer service life and simple assembly and demounting. The seals must no longer be connected to the inlet and outlet. According to the invention the ring must merely be put on or inserted.

What is claimed is:

1. In a material feed device for an extruder, comprising a storage container acting as a weighing container of a mass throughput weighing device and suspended with provision for free movement from measuring members and discharging via tubular outlet into an inlet of a feed unit of the extruder, the outlet and inlet being sealed off from outside by a seal which enables the storage container to move freely, the improvement wherein the tubular outlet has an outer surface and the inlet has a flat sealing surface surrounding the tubular outlet and the seal comprises a rigid ring having a radially inner side with a sealing surface extending around the radial inner side bearing against the outer surface of the tubular outlet of the storage container to permit axial movement of the outlet relative to the ring and having an underside flat sealing ring surface bearing on the flat sealing surface of the inlet of the feed unit to permit free movement of the ring relative to the inlet in the plane of the flat sealing surface.

2. A material feed device according to claim 1, wherein the parts sliding on one another have friction-reducing coating.

3. A material feed device according to claim 1, wherein the sealing surface extending around the inner radial side of the ring comprises a sealing lip.

4. A material feed device according to claim 1, wherein the underside flat sealing ring surface comprises a sealing lip.

5. A material feed device according to claim 1, wherein the storage container has the shape of a funnel.

6. A material feed device according to claim 1, wherein the extruder comprises a cylinder containing a feed screw.

7. In a material feed device for an extruder, comprising a storage container acting as a weighing container of a mass throughput weighing device and suspended for free movement by measuring members, the storage container having a lower opening and means forming a tubular outlet below the lower opening for discharging material into an inlet of a feed unit of the extruder and a seal for sealing off the inlet and outlet from the outside while permitting free movement of the container, the improvement wherein the means forming the tubular outlet comprises means mounting the tubular outlet laterally of the lower opening and an inclined surface disposed directly below said lower opening and feeding material from the lower opening to said laterally disposed tubular outlet.

* * * * *